Figure 1:
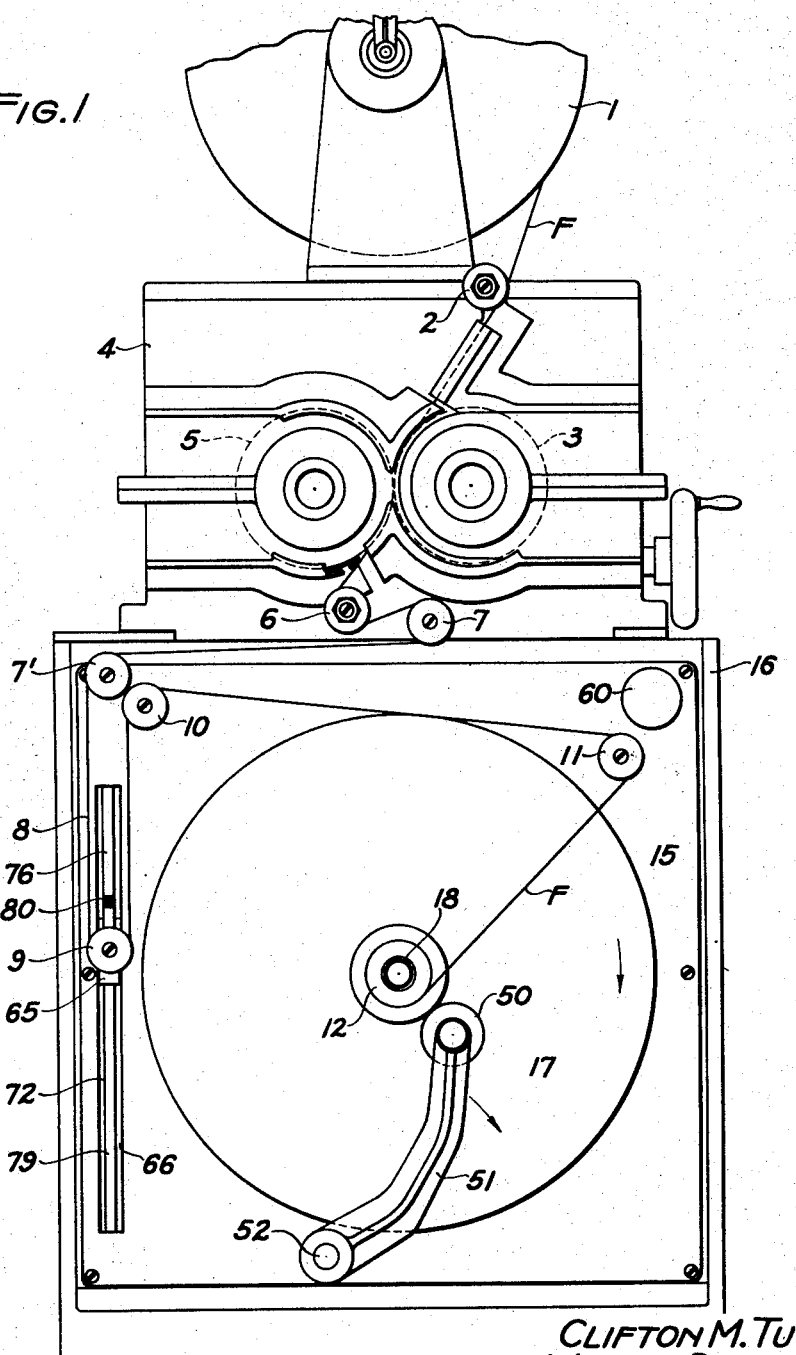

Dec. 15, 1942.  C. M. TUTTLE ET AL  2,304,971
WEB WIND-UP APPARATUS
Filed May 15, 1941  4 Sheets-Sheet 1

CLIFTON M. TUTTLE
WILLIAM BORNEMANN
INVENTORS

BY
ATTORNEYS

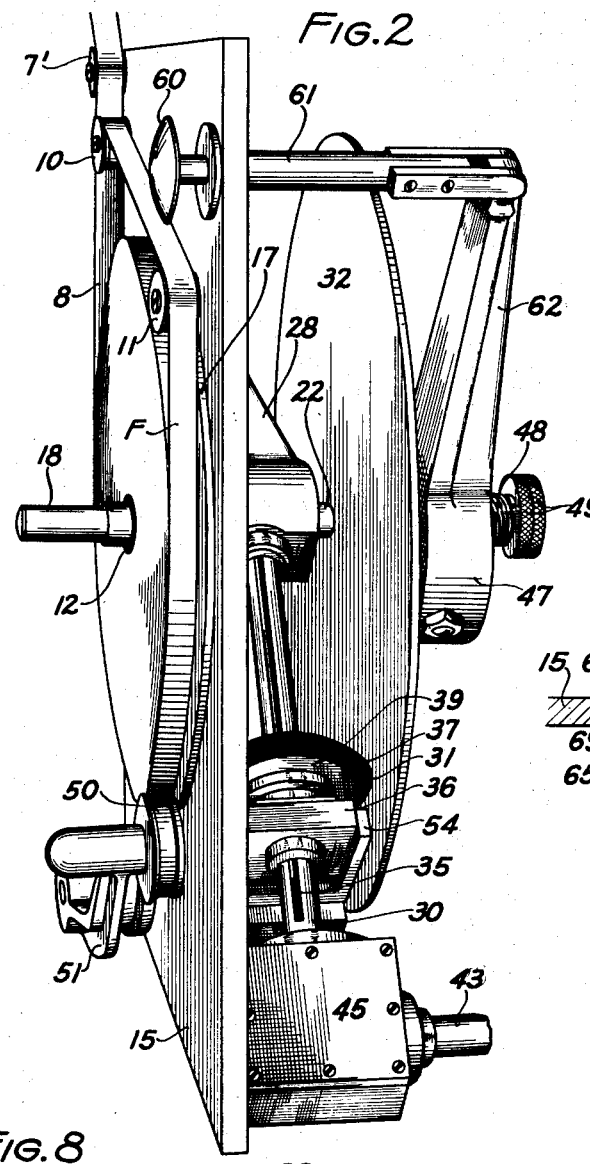
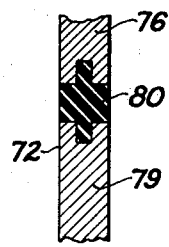
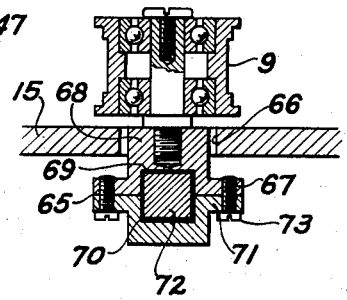
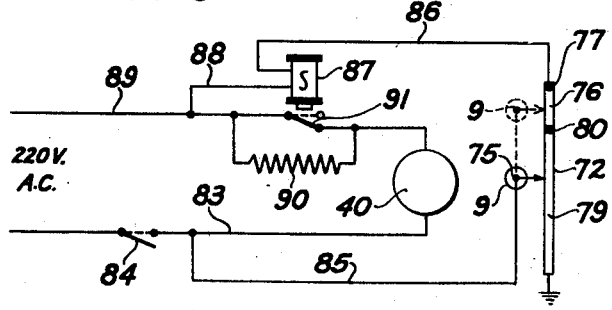

Dec. 15, 1942.  C. M. TUTTLE ET AL  2,304,971
WEB WIND-UP APPARATUS
Filed May 15, 1941  4 Sheets-Sheet 3
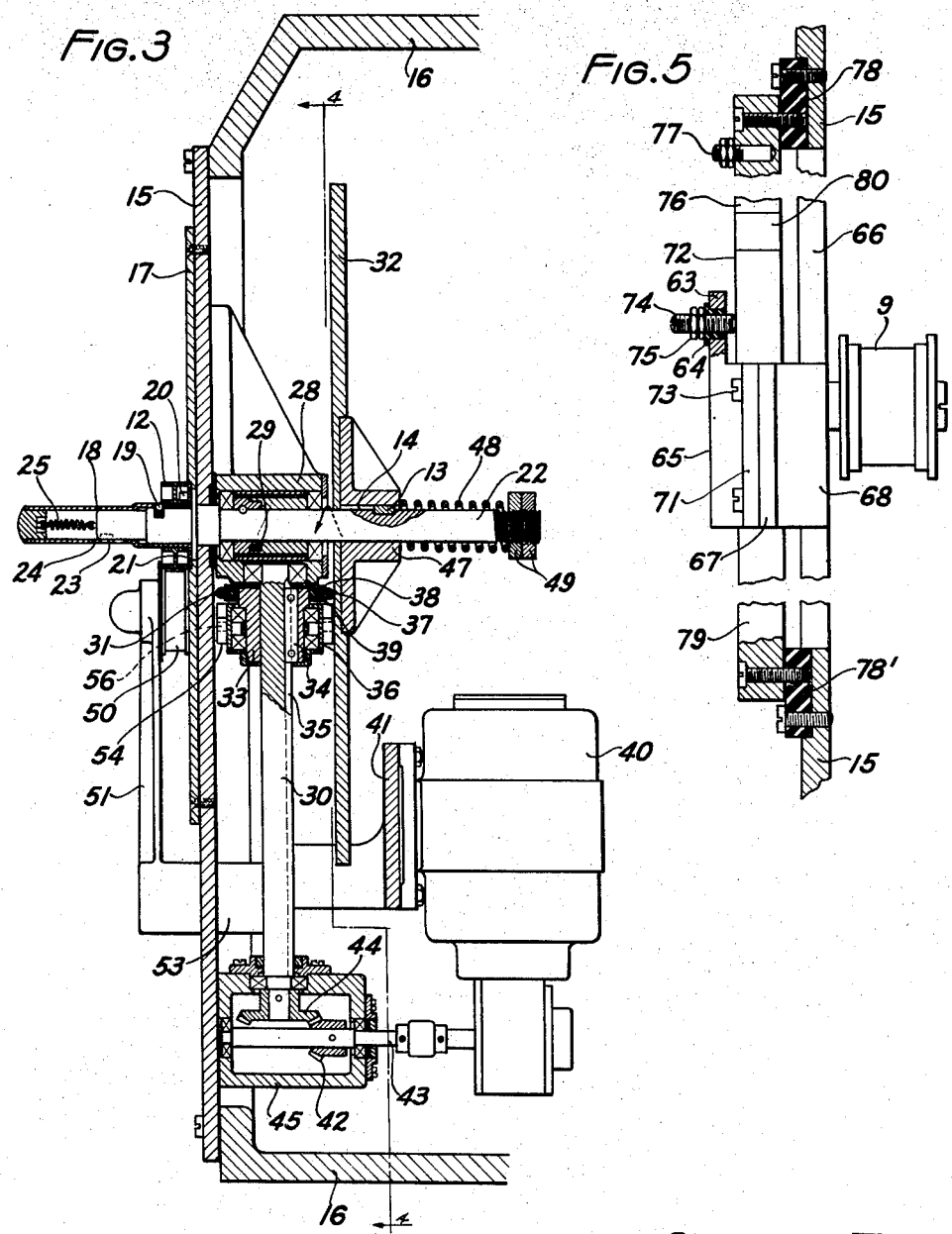
CLIFTON M. TUTTLE
WILLIAM BORNEMANN
INVENTORS
BY
ATTORNEYS

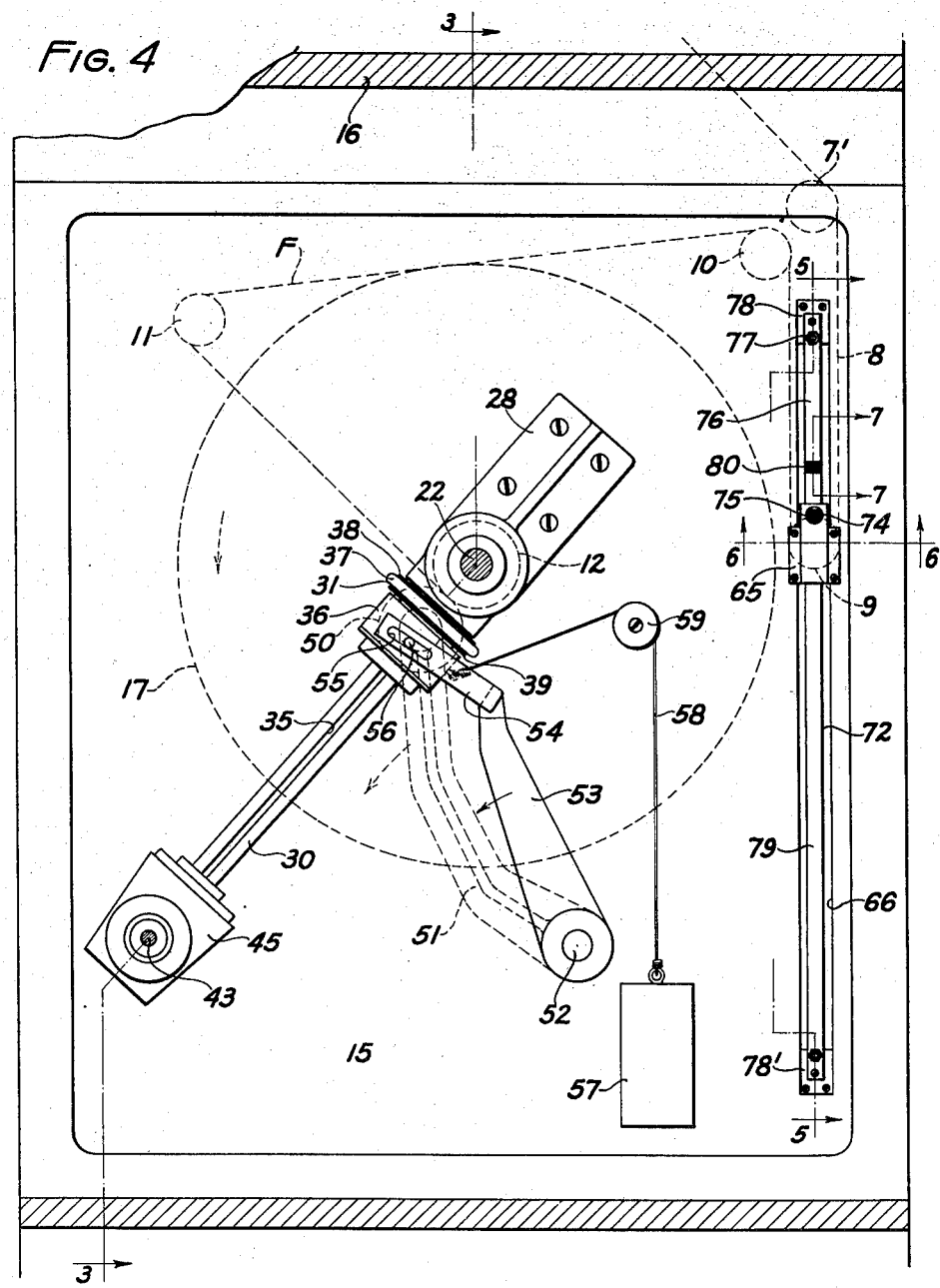

Patented Dec. 15, 1942

2,304,971

UNITED STATES PATENT OFFICE 2,304,971

WEB WIND-UP APPARATUS

Clifton M. Tuttle and William Bornemann, Rochester, N. Y., assignors to Eastman Kodak Company, Rochester, N. Y., a corporation of New Jersey Application May 15, 1941, Serial No. 393,588

3 Claims. (Cl. 242—75)

This invention relates to apparatus for winding up a web of material, and more particularly to a variable speed drive for the take-up roll including means for maintaining a uniform tension on the web being wound up from a constant speed source.

The primary object of our invention is to provide a variable speed drive for a wind-up roll, and including combined mechanical and electrical means for varying the speed of said drive for the purpose of maintaining a constant tension on the material being wound up.

Another object of our invention is to provide an apparatus for winding up a web in which the speed of the take-up reel is varied by a caliper roll engaging the periphery of the wind-up roll.

Another object of our invention is to provide an apparatus for winding a web in which a "trimming" control will vary the speed of the drive roll to account for any increased tension in the web. A further object of our invention is to provide an apparatus for winding the web that will operate at variable high speeds, and which will maintain a constant and uniform tension in the web being wound.

A still further object of our invention will appear from the following specification, the novel features being particularly pointed out in the claims at the end thereof.

In winding up a film, or a web of other material, which is fed to the wind-up roll at a constant speed, it is well known that the angular velocity of the wind-up roll must be continuously varied as the diameter of the wind-up roll changes. This variation is usually accomplished by allowing slippage to take place between the driver and the driven roll, and usually causes a change in the winding tension which may prove detrimental to the material being handled.

A well-known method of varying angular velocity is to drive a shaft by means of a rotating disk which, in turn, is driven by a roller in contact with the surface of the disk, the speed of the shaft carrying the disk being determined by the distance the roller is set from the center of the disk. By itself, this arrangement does not maintain a tension that is uniform enough for a film, or web, being wound at a high speed. The normal operating speed of a film perforator is approximately 30 to 40 feet per minute. However, if the speed of the perforator is stepped up to approximately 110 feet per minute, it has been found that the speed of the take-up roll will vary plus or minus 5 per cent, thereby causing an undesired increase or decrease in the film tension which at such increased speeds should remain constant to avoid abrasion of the film.

To correct this error of plus or minus 5 per cent, we have found that by varying the speed of the drive roller the residual error could be eliminated. This "trimming" control is accomplished by inserting resistance into the circuit of the rewind motor whenever the film tension increases, and removing this resistance as the tension decreases. The insertion or removal, of this resistance is determined by a floating roller which is connected into the rewind motor circuit.

Coming now to the drawings wherein like reference characters denote like parts throughout:

Fig. 1 is a front elevation showing the take-up mechanism as used in conjunction with a film perforating machine, Fig. 2 is a perspective view showing the take-up mechanism constructed in accordance with our invention, Fig. 3 is a sectional view taken on line 3—3 of Fig. 4, Fig. 4 is a rear elevation of the take-up mechanism taken substantially on line 4—4 of Fig. 3, Fig. 5 is a side elevation, partly in section, taken substantially on line 5—5 of Fig. 4, and showing the floating roll used for inserting the resistance into the rewind motor circuit, Fig. 6 is a section taken substantially on line 6—6 of Fig. 4, and showing the arrangement for mounting the floating roll, Fig. 7 is a sectional view taken substantially on line 7—7 of Fig. 4, showing the insulation disk inserted in the floating roll slide bar, Fig. 8 is a wiring diagram of the circuit used in our invention.

Our arrangement consists of combining a mechanical and an electrical control in such a way that the film being wound up on a take-up reel is at all times under constant tension. When film is wound at high speed, an increase or decrease in tension cannot be accounted for fast enough by the use of the mechanical control alone, but by combining an electrical control with the mechanical control any small increase or decrease in tension is immediately adjusted for. The electrical control, therefore, corrects for the residual error caused by the mechanical control. Our take-up mechanism is shown used in conjunction with our film perforating machine, a full description of which is contained in our U. S. Patent 2,206,138, issued July 2, 1940, and which forms no part of the present invention except to show a source of supplying film to the take-up mechanism at a constant speed.

The film F passes down from a supply roll 1 over a guide pulley 2 into contact with the periphery of the die roll 3 in the film perforator 4. Perforations are cut in the film F by the plungers carried by the roll 5 as the film passes between the roll 5 and the die roll 3. The film as it is perforated moves away from the roll 5 over the guide pulleys 6, 7, and 7' and forms a loop 8 in which is positioned a floating roller 9 which is free to move up and down with an increase or decrease in tension of the film. A further description of the purpose and structure of this floating roll will be described hereinafter. After forming the loop, the film passes over the guide pulleys 10 and 11 to the take-up core 12.

The take-up mechanism is mounted on a plate 15 which is secured to the frame 16 of the film perforator 4. A circular plate 17 is fixed to the plate 15 to form, in effect, a flange against which the film is wound. The take-up core 12 is carried by a sleeve 18, and is held in position against the plate 17 by the spring pressed ball 19, and is driven by the pin 20 carried by the flange 21 of the sleeve 18 which is connected to the shaft 22 by the key 23. To remove the take-up core 12 after it has been wound with film, the sleeve 18 is pulled away from the plate 17 and the inner diameter of the take-up core 12 depresses the spring pressed ball 19 so that the film and core may be removed from the sleeve 18. The sleeve is provided with a slot 24 for the key 23 which also acts as a longitudinal guide for the sleeve 18. The spring 25, connected to sleeve 18 in the shaft 22, returns the sleeve to its normal position.

The shaft 22 is mounted in the bearing bracket 28 which is secured to the rear face of the plate 15 and which has mounted on the shaft in the bearing a one-way clutch 29. The purpose of the one-way clutch 29 is to prevent any rotation in a counter-clockwise direction which will tend to unwind the film from the take-up core 12. Journaled in the bottom of the bearing bracket 28 is a shaft 30 which carries the drive roller, designated broadly by the numeral 31, 31 which drives the disk 32 connected to the shaft 22. The drive roller 31 comprises a sleeve 33 to which is fixed a key 34 that is slidable in the groove 35 in the shaft 30, and which is mounted in the movable bearing bracket 36. Mounted on the sleeve 33 is a rubber ring 37 which is held in place by the retaining plates 38 and 39 and provides the driving connection between the shaft 30 and the disk 32.

The shaft 30 is driven by the rewind motor 40, which is mounted on the bracket 41 secured to the plate 15, through the bevel gear 42 connected to the shaft 43 and the bevel gear 44 connected to the shaft 30. The gears 42 and 44 are enclosed in a housing 45 which is fastened to the plate 15.

The disk 32 is driven by the drive roller 31 and is secured to the flange of the bearing sleeve 47 and pressed against the drive roller 31 by the spring 48 coiled around the shaft 22 and held in place by the threaded collar 49. The disk 32 drives the shaft 22 through the key 13 of the shaft 22 and the key slot 14 in the disk bearing sleeve 47, at a variable speed depending on the position which the drive roller assumes radially of the face of the disk 32.

The position that the drive roller 31 assumes radially of the face of the disk 32 is determined by calipering roll 50 which is in contact with the film being wound on the take-up core 12. As the diameter of the take-up roll increases, the speed of the shaft 22 will have to be decreased, and this is accomplished by moving the drive roller 31 along the shaft 30 toward the periphery of the disk 32. The calipering roll 50 is mounted on an arm 51 secured to a shaft 52 extending through the plate 15, to this same shaft, on the other side of the plate 15, is secured another arm 53. A yoke 54 provided with slots 55, in which the pins 56 carried by the bearing bracket 36 are positioned, comprises the other end of the arm 53 to move the drive roller 31 along the shaft 30 as the caliper roll 50 moves with an increase in diameter of the take-up roll. The calipering roll 50 is normally held in contact with the periphery of the take-up roll by the counter-weight 57 on the end of the cord 58 which passes over the pulley 59 fastened to the plate 15, and is secured to the bearing bracket 36. The effect of the counter balance is transmitted through the arm 52 to the arm 51 carrying the caliper roll 50.

To permit the operator to return the drive roller to its starting position after a certain amount of film has been wound, the knob 60 on the front face of the plate 15, see Fig. 2, connected by a rod 61 to an arm 62 on the disk bearing sleeve 47, is pushed inwardly to remove the face of the disk 32 from contact with the drive roller 31. After the knob 60 has been pushed in and held there, the arm 51 may swing in a counter-clockwise direction which will also move the arm 53 carrying the drive roller 31 and move the drive roller along the shaft 30 to its starting position. Upon releasing the knob 60, the disk 32 and the bearing sleeve 47 are returned to a driving position by the spring 48.

The above-described mechanism, by itself, does not provide a constant uniform tension at high speeds, and to correct for the error caused by this mechanical arrangement, we have found that by combining an electrical control with the mechanical control any residual error is eliminated, and the tension is both uniform and constant.

In operation, the above-described mechanical control controls to plus or minus 5 per cent of the correct speed, and the electrical, or "trimming," control, hereinafter fully set forth, corrects the residual error. The electrical arrangement consists of a floating roller that is positioned in the film path before it reaches the take-up roll so as to insert a resistance into the circuit of the rewind motor as the tension of the film increases, and to remove the resistance as the tension decreases, from a given value.

The floating roller 9 is mounted on a slidable mount 65 extending through the opening 66 of the plate 15. The slidable mount 65 comprises a plate 67 which has an extension 68 that rides in the opening 66 and a longitudinal recess 69 that cooperates with a similar recess 70 in the plate 71 to form a square opening for the guide rod 72, the plates 67 and 71 being held together by screws 73. The plate 71 has an extending lug 63 containing the threaded insulating plug 64 to retain a setscrew 74 to form a terminal 75, see Fig. 5, the purpose of which will be described hereinafter.

The guide rod 72 is composed of two parts; a short upper part 76 carrying a terminal 77 is secured to an insulating block 78 secured to the plate 15; and a long lower part 79 which is secured to a block 78' secured to the plate 15. Between the two parts 76 and 79 is located an insulating strip 80, see Fig. 7, the purpose of which will be described hereinafter.

The terminal 75 of the slidable mount 65 on the floating roller 9 is connected to the line 83 of the rewind motor circuit, in which the starting switch 84 is connected, by the line 85; and the terminal 77, on the upper part 76 of the guide rod 72, is connected by the line 86 to the relay 87, as shown in Fig. 8. The line 88 of the relay 87 is connected to the other line 89 of the rewind motor circuit, and a resistance 90 is connected in series with the motor across the normally closed switch 91 operated by the relay 87. The insulating strip 80 separates the upper part 76 of the guide rod 72 which is a part of the relay circuit from the lower part 79 which is grounded.

In operation, after the film has passed through the film perforator 4 and over the guide pulleys to the take-up core 12, the caliper 50 and the drive roller 31 are brought into the starting position, see Fig. 3, as described above. The rewind motor 40 is started by closing the switch 84, see Fig. 8, with the floating roll 9 in the position shown in Fig. 4. As the diameter of the take-up roll increases, the arm 51 carrying the caliper roll 50 is moved in a clockwise direction, as shown in Fig. 1, rotating the shaft 52 and the arm 53. As the arm 53 moves in a clockwise direction, the yoke 54 moves the drive roller 31 along the shaft 30 toward the periphery of disk 32 to decrease the speed of the shaft 22.

If the take-up speed is too fast, the tension of the film is increased and the floating roll 9 rises. The setscrew 74, forming the terminal 75 of the slidable mount 65 of the floating roller 9, which was in circuit with the lower part 79 of the guide rod 72 is moved upwardly by the film loop 8 until it passes over the insulating strip 80 to contact the upper part 76 of the guide rod 72. When this contact is made, the relay 87 is energized and opens the switch 91 inserting the resistance 90 into the circuit which slows down, but does not stop, the rewind motor 40. As the rewind motor 40 slows down the tension in the film F decreases, and the floating roll 9 is lowered as the loop 8 becomes longer. When the setscrew 74 contacts the insulating strip 80 due to the falling of the floating roll 9, the relay 87 is de-energized, the switch 91 is closed short-circuiting the resistance 90 from the rewind motor circuit. The motor then continues to drive the take-up reel through the drive roll 31. The floating roll 9 will oscillate back and forth over the insulating disk 80, alternately cutting the resistance 90 into and out of the motor circuit to give a uniform and constant tension to the film F being wound on the take-up core 12.

The applicants are aware that drives comprising friction drive rollers movable radially of the driven disk have been known and used for some time in connection with wind-up mechanisms to vary the angular velocity of the take-up reel in accordance with the change in diameter of the take-up roll. We are further aware that the use of a caliper roll for moving the friction drive roll radially of the driven disk has been known along with many other arrangements for so moving the friction drive roll. However, we have found that where the web is fed to the take-up roll at high speeds, 100 feet per minute or faster, this method of speed control is not accurate to within plus or minus 5 per cent in maintaining uniform tension on the web being wound. We are also aware that it has previously been proposed to vary the speed of a rewind motor by varying the resistance of the motor circuit in an effort to give a constant take-up. This method of control is not practical where there is a rapid change required in the angular velocity of the take-up reel, as is the case where the diameter of the roll changes rapidly from the time the core is empty until it reaches a substantially large diameter. For this reason, a straight electrical control of the sped of the wind-up motor has never proven satisfactory in rewind mechanisms of the type set forth, particularly where the web is fed to the take-up roll at high speeds, or speeds in the neighborhood of 100 feet per minute or greater.

The applicants have found that if the mechanical and electrical speed controls for the wind-up mechanism of a web are combined as set forth, a constant speed take-up can be obtained with which a uniform tension can be maintained in the web even when winding up webs fed at 100 feet per minute or more. In applicant's combination, the mechanical control is relied upon to account for the necessary rapid changes in angular velocity, and the electrical control is relied upon to account for the small change in the angular speed which the mechanical control is not sensitive enough to handle, but which the electrical control is particularly adapted to account for.

Although we have shown and described a specific embodiment of our invention, we are fully aware that many modifications thereof are possible. Our invention, therefore, is not to be restricted except in so far as is necessitated by the prior art and by the spirit of the appended claims.

Having thus described our invention, what we claim is new and desire to secure by Letters Patent of the United States is:

1. In an apparatus for winding a web at uniform tension, the combination with a driven member for rotating a take-up coil of said web, mechanical means operable by a change in diameter of said coil, including an electric motor, for driving said driven member at variable angular velocities, and a source of potential for said motor, of a roller supported in a loop of said web and movable in response to a variation in the tension of said web, a fixed guide member along which said roller is movable, said roller being electrically connected to one side of said source of potential, an electrical resistance adapted to be inserted in the circuit of said motor to decrease the speed thereof upon an increase in the tension of said web, a solenoid connected to the other side of said source of potential, means for connecting a portion only of said guide member in the circuit of said solenoid, a contact member carried by said roller and adapted to engage said portion upon an increase of the tension of said web to operatively connect said solenoid to said source of potential to energize said solenoid, and means controlled by said energized solenoid for inserting said resistance into said motor circuit.

2. In an apparatus for winding a web at uniform tension, the combination with a driven member for rotating a take-up coil of said web, driving means, including a driving member frictionally engaging said driven member and movable radially thereof, an electric motor for driving said driving member, a source of potential for said motor, and a primary mechanical control means actuated by a member engaging the periphery of said coil for moving said drive member relative to said driven member to compensate for change of diameter of said coil, of a roller supported in a loop of said web and movable in response to a variation in the tension of said web, a fixed guide member along which said roller is movable, said roller being electrically connected to one side of said source of potential, an electrical resistance adapted to be inserted in the circuit of said motor to decrease the speed thereof upon an increase in the tension of said web, a solenoid connected to the other side of said source of potential, means for connecting a portion only of said guide member in the circuit of said solenoid, a contact member carried by said roller and adapted to engage said portion upon an increase of the tension of said web to operatively connect said solenoid to said source of potential to energize said solenoid, and a switch member controlled by said energized solenoid for inserting said resistance into said motor circuit.

3. In an apparatus for winding a web at uniform tension, the combination of a driven disc for rotating a take-up coil of said web, a driving roller frictionally engaging the surface of said driven disc and movable radially thereof to vary the angular velocity of said disc, an electric motor for driving said driving roller, means for varying the angular velocity of said driven disc to maintain a constant tension on the web being wound up, said last mentioned means comprising a primary mechanical control including a caliper member normally engaging the periphery of said coil of web and mechanically connected to said driving roller to move the same radially of said driven disc in accordance with a change in diameter of said coil of web, and a secondary electrical control independent of said primary control, including an electrical circuit for effecting the insertion and removal of a resistance into and from the motor circuit respectively, a fixed guide member having a portion connected to said electrical circuit, a member movable along said guide member in response to a change in tension in the web being fed and adapted to engage said portion to cause the insertion ' a resistance into, and adapted to disengage said portion to cause the removal of a resistance from, said motor circuit in accordance with a variation in tension in said web relative to a given tension.

CLIFTON M. TUTTLE.
WILLIAM BORNEMANN.